May 6, 1952 P. W. THORNHILL 2,595,426
PNEUMATIC SUSPENSION STRUT
Filed Sept. 16, 1949
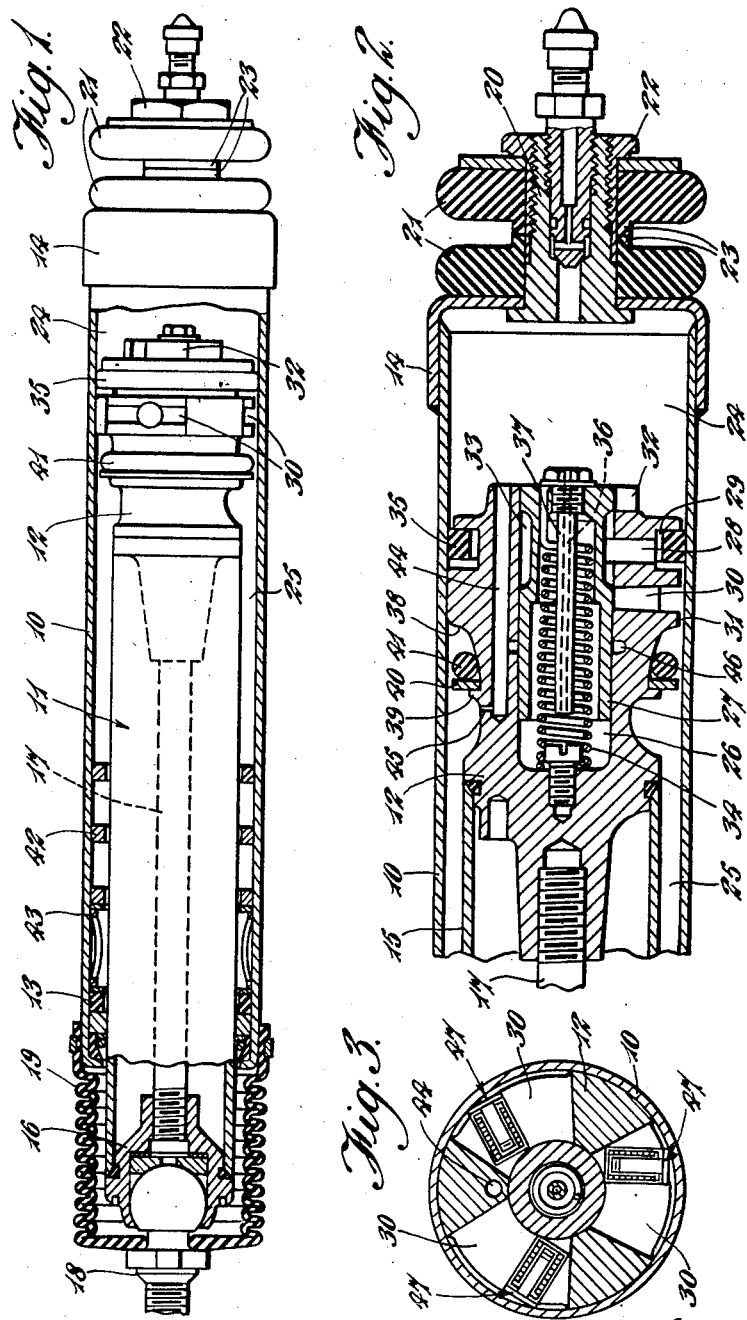

Patented May 6, 1952

2,595,426

UNITED STATES PATENT OFFICE 2,595,426

PNEUMATIC SUSPENSION STRUT

Peter Warborn Thornhill, Leamington Spa, England, assignor to Levitation Limited, Leamington Spa, England Application September 16, 1949, Serial No. 116,157
In Great Britain October 4, 1948

3 Claims. (Cl. 267—64)

1

This invention relates to pneumatic suspension struts of the kind comprising a plunger and cylinder unit the cylinder of which contains air under pressure which is further compressed due to the movement of the plunger in the cylinder when the strut shortens, thus storing energy which tends to return the strut to its normal length, the plunger having a piston head dividing the cylinder into two working chambers, and the passage of air past the piston head being controlled, to damp the movements of the strut, in such a way that, during the extension of the strut, a pressure can be built up in the annular working chamber below the piston head which is greater than the pressure simultaneously existing in the working chamber above the piston head; reference hereinafter to "a pneumatic suspension strut of the kind referred to" is to be understood as meaning a strut having the features set out in this paragraph.

The control of the damping in a pneumatic suspension strut of the kind referred to necessitates the use of a valve or valves in the piston head, and other mechanism may be mounted therein, such as the mechanism described in British Patent Specification No. 595,388, with reference to Figures 2 to 6 thereof, for effecting rotation of the plunger relative to the cylinder. It has been found that such valves and other mechanism require lubrication, and some difficulty has been experienced in providing adequate lubrication thereof. The object of the present invention is to provide means for lubricating valves and any other mechanism situated in the piston head of a pneumatic suspension strut.

According to the present invention, in a pneumatic suspension strut of the kind referred to a passage is provided in the plunger which extends from the upper surface of the piston head to a point in the plunger below the said piston head, the annular working chamber of the strut containing oil in which the lower end of the passage is immersed during at least a part of the extension stroke so that when, during such immersion the air pressure in the annular working chamber rises above that in the other working chamber oil is forced through the said passage to the upper surface of the piston head.

The pressure in the annular working chamber may be raised above that in the other working chamber by the action of rebound checking means comprising a sealing member located in the annular working chamber and adapted normally to take up a position in which it does not prevent flow of air to the other working chamber, and

2 means acting when the strut is extended to a predetermined length, to urge the sealing member into air-tight engagement with both the cylinder and the plunger, so as to trap air in the annular space, the lower end of the passage being arranged to become immersed in the oil when the rebound checking means becomes operative.

The invention is hereinafter described with reference to the accompanying drawings, in which:

Figure 1 is a sectional elevation of one form of suspension strut according to the invention, the plunger being shown in elevation;

Figure 2 is an enlarged view of the upper part of Figure 1, the plunger being shown in section; and Figure 3 is a section on the line 3—3 of Figure 2.

Referring to the drawings, the pneumatic suspension strut shown therein comprises a cylinder 10 and plunger 11, the plunger carrying a piston head 12 which is a sliding fit in the cylinder, and extending through a fluid-tight packing 13 in one end of the cylinder. The other end of the cylinder is closed by an end cap or head 14. The plunger comprises a tube 15 clamped between the piston head 12 and a plug 16 by a stem 17 having screw threaded ends to engage with screw-threaded sockets in the piston head 12 and plug 16. The strut is arranged for mounting by means of a ball-headed stud 18 rotatably supported in the plug 16 and projecting through a flexible boot 19 which covers the projecting part of the plunger; and a stem 20 projecting from the cylinder head 14 and adapted to pass through a hole in a flat mounting bracket which is clamped between two rubber discs 21, 21 mounted on the stem 20 and retained by a nut 22. The discs 21, 21 have short spigots 23, 23 which enter the hole in the bracket.

The piston head 12 separates the two working chambers of the strut, which are, respectively, the space 24 between the said head 12 and the cylinder head 14, and the annular space 25 between the head 12 and the packing 13.

The piston head is formed with a cylindrical recess 26 opening into the working chamber 24, the recess 26 accommodating a hollow cylindrical valve member 27.

Two sets of radial ports, one set of which is spaced axially from the other, lead into the recess 26, the ports 28 of the set nearer to the working chamber 24 opening into a circumferential groove 29 on the outer surface of the piston head, whilst the ports 30 of the other set open into relieved portions 31 of the said surface. A plurality of radial slots 32 are formed in the surface of the piston head which faces the working chamber 24, and the valve member 27 is formed with a circumferential recess 33 which has a length just equal to the distance between the proximate edges of the ports 30 and the slots 32.

The valve member 27 is located normally, by a spring 34, substantially in a central position in which the recess 33 lies wholly between the ports 30 and the slots 32, and it will be apparent that displacement of the valve member in one or other direction will place either the ports 30 or the slots 32 in communication with the ports 28. The groove 29 in the piston head contains a packing ring 35 which is of smaller dimensions than the groove in both width and depth, and is in frictional engagement with the cylinder wall, so that it tends to engage with one or other side wall of the groove 29 according to the direction of movement of the plunger in the cylinder, and to act as a valve permitting flow of air from one or other of the working chambers into the annular recess in the valve member, whilst preventing direct flow of air from one working chamber to the other.

The recess 26 is connected to the working chamber 24 by a passage 36 of very small bore formed in a stem 37 mounted in the valve member.

Below the part of the head 12 which engages the cylinder wall, the plunger has a part 38 of substantially frusto-conical shape, at the smaller end of which, that is the end remote from the head itself, is formed a shoulder 39 which supports a split resilient metal washer 40 in turn supporting a rubber ring 41 of round section. The ring 41 is of such thickness that there is clearance between it and the cylinder wall when the said ring is resting on the washer 40 and the latter is resting on the shoulder 39. A spring 42 is mounted in the working chamber 25, the spring taking its abutment on a distance sleeve 43 resting on the packing 13, and it will be seen that when the strut is extended to such an extent that the washer 40 engages the spring 42, the said washer will be displaced from the shoulder 39, and the rubber ring 41 will be caused to move up the frusto-conical surface 38 until it is expanded into contact with the cylinder wall, and closes the working chamber 25, so that any further extension of the strut can only compress the air in that chamber, which produces a rapidly increasing resistance to such extension.

A longitudinal passage 44 is formed in the piston head, alongside the recess 26 therein, the passage opening at one end into the working chamber 24, and being closed at its other end. Adjacent the closed end of the passage 44, a transverse passage 45 of very small bore leads to the outside of the plunger, this passage 45 being below the shoulder 39. The passage 44 is connected to a circumferential groove 46 surrounding the recess 26.

In each of the ports 30 there is mounted a device, indicated at 47 in Figure 3 for producing rotation of the plunger in the cylinder as a result of the relative longitudinal movement of those parts. These devices comprise rotary pads mounted with their axes in a plane perpendicular to the axis of the unit but offset from the said axis and free to rock slightly in planes parallel to the longitudinal axis, the pads being urged against the cylinder wall by springs. These devices are fully described, and their operation explained, in the specification of British Patent No. 595,388, and no further description of them will be included herein.

The device operates in the following manner, it being understood that the working chamber 25 is filled with oil up to a level just below the upper end of the spring 42. When a vehicle on which the suspension is provided by a plurality of devices according to the invention is stationary, or is travelling on a perfectly smooth surface, the plungers take up a position in the cylinders such that the air pressure in the devices just supports the weight of the vehicle. If a wheel strikes a bump in the road, and is lifted, the plunger in the suspension device between that wheel and the body of the vehicle rises, increasing the air pressure in the working chamber 24. As the recess 26 is connected to the working chamber 24 only by the passage 36 the pressure in the recess rises much more slowly than the pressure in the chamber 24, and the valve member 27 is therefore displaced into the recess, allowing air to pass from the working chamber 24 into the working chamber 25, the air passing the ring 35, which, due to the upward motion of the plunger, is against the lower wall of the groove, and flowing through the ports 28, recess 33 and ports 30 into the working chamber 25. When the strut ceases to shorten, the air is unable to return through the same path to the chamber 24, as the tendency of the strut to extend moves the packing ring 35 over to the opposite side of the groove 29, but the extension of the strut causes a fall of pressure in the working chamber 24 which ultimately brings that pressure to a value below that in the recess 26, allowing the valve member 27 to move and connect the ports 28 to the slots 32. Air can then pass from the working chamber 25 back into the working chamber 24 by way of the ports 28, recess 33 and slots 32, and the device thus returns smoothly to its static position.

If a wheel of the vehicle drops into a pothole or like depression, the plunger of the suspension strut between that wheel and the body moves downwardly, and the pressure in the working chamber 24 falls, so that the valve member 27 moves upwardly. As the packing ring 35 is urged by the plunger movement against the upper wall of the groove 29, fluid can pass through that groove to the ports 28, and so through the recess 33 and ports 30 into the working chamber 24. When the plunger ceases to move downwardly, and tends to return, the packing ring 35 moves over to the other side of the groove 29, and the return of air to the working chamber 25 is prevented until the pressure in the chamber 24 has risen sufficiently to depress the valve member and so connect the ports 28 to the ports 30.

So long as the displacements of the plunger are small, the extension-limiting device does not come into action, but if a wheel drops into a deep hole, or excessive extension takes place for any other reason, the washer 40 engages the spring 42 and the ring 41 is forced upwardly to prevent air from the working chamber 25 reaching the ports 30 and so passing into the working chamber 24. Continued extension thus results in a rapid increase of the pressure in the chamber 25, which forces oil from that chamber through the passages 45 and 44 to the top of the piston head and to the recess 26. The oil which reaches the top of the piston flows over the whole piston head and some of it reaches the ports 30, to provide lubrication for the devices 47. Oil reaches the recess 26 both from the top of the piston head and from the groove 46, to lubricate the valve member 27.

The invention may be applied to pneumatic suspension struts having damping arrangements other than that described above. For example, such a strut may have a non-return valve in the piston head through which air flows during the compression stroke, the extension stroke being damped by passing the air through a restricted passage the lower end of which is spaced some distance below the underside of the piston head and, at a predetermined point in the extension stroke, becomes immersed in oil in the annular working chamber, thus trapping air in the top of that chamber and raising the pressure of the trapped air to force liquid through the passage to the top of the piston head.

What I claim is:

1. A pneumatic suspension strut comprising a cylinder, a plunger slidably disposed in said cylinder, a piston head on said plunger dividing said cylinder into a first working chamber and a second working chamber, the second chamber containing a lubricating fluid and the first chamber containing air, passage means in said piston head for permitting air to flow from the first chamber into the second chamber, valve means in said head for controlling the flow of air in said passage means to damp the movements of the strut, means circumposed on the plunger head and selectively engageable between the walls of the cylinder and the piston head for closing off said passage means, said last means being operative upon excessive extension of the strut, and passage means in said piston head communicating with the second chamber and with the first chamber, said last passage means communicating with the second chamber below said last mentioned means for permitting the flow of the lubricating fluid into the first chamber reactive to the increased air pressure in the second chamber.

2. A pneumatic suspension strut comprising a cylinder, a plunger slidably disposed in said cylinder and sealingly extendable through one end thereof for connection with a strut, a piston head on said cylinder slidably engaged with the wall of the cylinder and spaced at one portion of its periphery out of engagement with the wall of the cylinder, said piston head dividing the cylinder into a first chamber and a second chamber, said first chamber containing air and said second cylinder containing a lubricating fluid and being formed at the strut connecting end of the plunger, said piston head having an axial recess in the end thereof facing the first chamber and communicating with said chamber and having radial ports communicating said recess with the portion spaced from the wall of the cylinder to define a passage for the flow of air from the first chamber to the second chamber, valve means operatively mounted in the recess for controlling the flow of air in said passage to damp the movements of a strut connected to the plunger, means circumposed on the piston head for selective engagement between said spaced portion of the head and the wall of the cylinder to close off the passage upon excessive extension of the strut, and passage means in said piston head communicating with the first chamber and the second chamber, said passage means communicating with the second chamber below said last mentioned means for permitting the flow of the lubricating fluid into the first chamber reactive to the increased air pressure in the second chamber under further movement of the piston head in said second chamber.

3. A pneumatic suspension strut comprising a cylinder, a plunger slidably disposed in said cylinder and sealingly extendable through one end thereof for connection with a strut, a piston head on said cylinder slidably engaged with the wall of the cylinder and spaced at one portion of its periphery out of engagement with the wall of the cylinder, said piston head dividing the cylinder into a first chamber and a second chamber, said first chamber containing air and said second cylinder containing a lubricating fluid and being formed at the strut connecting end of the plunger, said piston head having an axial recess in the end thereof facing the first chamber and communicating with said chamber and having radial ports communicating said recess with the portion spaced from the wall of the cylinder to define a passage for the flow of air from the first chamber to the second chamber, valve means operatively mounted in the recess for controlling the flow of air in said passage to damp the movements of a strut connected to the plunger, means circumposed on the piston head for selective engagement between said spaced portion of the head and the wall of the cylinder to close off the passage upon excessive extension of the strut, said piston head having an axial passageway paralleling the recess and extending axially in the piston head from the end of the piston head facing the first chamber to a point beyond the last mentioned means and said piston head having a lateral port disposed beyond said last mentioned means and communicating with the axial passageway for establishing communication between the first and second chambers upon operation of said last mentioned means.

PETER WARBORN THORNHILL.

REFERENCES CITED

The following references are of record in the file of this patent:

UNITED STATES PATENTS

| Number | Name | Date |
|---|---|---|
| 2,098,398 | Mercier | Nov. 9, 1937 |
| 2,369,007 | Beecher | Feb. 6, 1945 |
| 2,476,228 | Thornhill | July 12, 1949 |